United States Patent
Baur et al.

[11] Patent Number: 5,947,665
[45] Date of Patent: *Sep. 7, 1999

[54] LOADING FIXTURE

[75] Inventors: Kenneth C. Baur, Mohnton; Kathleen M. Scholz, Shillington; William L. Whary, Mohnton; Rand Henry, Nottingham, all of Pa.

[73] Assignee: High Concrete Structures, Denver, Pa.

[ * ] Notice: This patent is subject to a terminal disclaimer.

[21] Appl. No.: 09/206,649

[22] Filed: Dec. 7, 1998

Related U.S. Application Data

[63] Continuation of application No. 08/962,959, Nov. 4, 1997, which is a continuation of application No. 08/639,783, Apr. 29, 1996, Pat. No. 5,683,213.

[51] Int. Cl.$^6$ ..................................................... B60P 07/08
[52] U.S. Cl. ........................... 410/44; 280/405.1; 410/156
[58] Field of Search ............................. 410/44, 45, 156; 280/405.1; 414/800

[56] References Cited

U.S. PATENT DOCUMENTS

| | | | |
|---|---|---|---|
| 1,519,319 | 12/1924 | Manning | 410/44 |
| 2,725,241 | 11/1955 | Leonard, Jr. | 410/44 |
| 2,808,288 | 10/1957 | Benson | 410/44 |
| 2,903,274 | 9/1959 | Leonard, Jr. | 410/44 |
| 3,154,207 | 10/1964 | Long | 410/44 |
| 3,655,218 | 4/1972 | Taylor | 410/44 |
| 5,683,213 | 11/1997 | Baur et al. | 410/44 |
| 5,785,472 | 7/1998 | Smith et al. | 410/44 |

FOREIGN PATENT DOCUMENTS

| | | | |
|---|---|---|---|
| 1111913 | 9/1984 | U.S.S.R. | 410/44 |
| 1207850 | 1/1986 | U.S.S.R. | 410/44 |

*Primary Examiner*—Christopher P. Ellis
*Assistant Examiner*—Gregory A. Morse
*Attorney, Agent, or Firm*—Duane Morris & Heckscher LLP

[57] ABSTRACT

Hauling vehicles, fixtures and methods for loading heavy cargo are provided. The fixture enables such cargo to be loaded on a trailer, boat or railway with a reduced "effective width". Such fixtures include a support frame and an arm which may be pivotally mounted to the support frame for enabling the cargo to be tilted from a first loading position to a second transporting position to reduce the degree to which the cargo extends beyond the width of the trailer. A plurality of perpendicular members extend from positions near the ends of the arm. Each perpendicular member has a rotating boot near an end opposite the arm. The rotating boot is shaped to contact and support an internal corner of the cargo, which may be a concrete double-tee. Transportation costs are significantly reduced through the use of the fixture, vehicle and method.

22 Claims, 2 Drawing Sheets

LOADING FIXTURE

RELATED APPLICATION DATA

This application is a continuation of copending U.S. application Ser. No. 08/962,959, filed on Nov. 4, 1997, which is a continuation of U.S. application Ser. No. 08/639,783, filed on Apr. 29, 1996, now U.S. Pat. No. 5,683,213, issued Nov. 4, 1997.

FIELD OF INVENTION

This invention relates to fixtures for restraining large bulky objects for transport over land, rail or waterways, and in particular to fixtures that can reduce the effective width of bulky loads so as to minimize travel restrictions.

BACKGROUND OF THE INVENTION

Prefabricated assemblies have become increasingly popular in the construction trade. Such assemblies can include precast concrete structures, frame supports or even manufactured homes. The transport of these assemblies is highly regulated by the states. Transporting over-sized loads involves speed and weight restrictions, frequent escorting by warning vehicles and high tariffs. Over-width vehicles may be completely barred from entering narrow roadways, bridges or tunnels during certain hours of the day. Such additional detours and delays can increase the cost of transportation of such items by hundreds of dollars and can postpone the timing of delivery to the construction site. Since construction workers often begin their day at a set time every morning, delivery delays can further increase labor costs to contractors as workers wait idly for essential building materials.

SUMMARY OF THE INVENTION

The present invention is a loading fixture suitable for transporting cargo, and a method of loading cargo for transport. The loading fixture comprises an arm disposed to support the cargo in a tilted transporting position for reducing the effective width of the cargo relative to a transport surface. A pair of perpendicular members extend in a perpendicular direction from the arm. A plurality of boots are disposed on respective end portions of each of the perpendicular members. Each boot is shaped to contact and support an inside corner of the cargo.

The method of loading cargo for transport includes: positioning a plurality of boots into positions for contacting and supporting respective inside corners of the cargo; and loading the cargo on a loading fixture having a tilted transporting position for reducing the effective width of said cargo relative to a transport surface. The fixture has an arm and a pair of perpendicular members extending in a perpendicular direction from said arm. Each of the plurality of boots is disposed on a respective end portion of a respective perpendicular member, such that each of the boots contacts a respective corner of the cargo.

BRIEF DESCRIPTION OF THE DRAWINGS

The accompanying drawings illustrate preferred embodiments of the invention according to the practical application of the principles thereof, and in which.

DETAILED DESCRIPTION OF THE INVENTION

Figure 1:
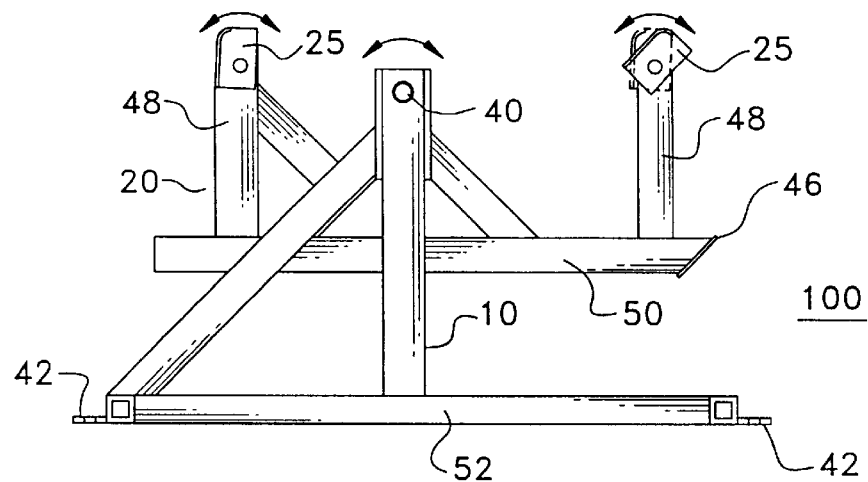
FIG. 1: is a front plan view of a preferred loading fixture of this invention in a loading position.
Figure 2:
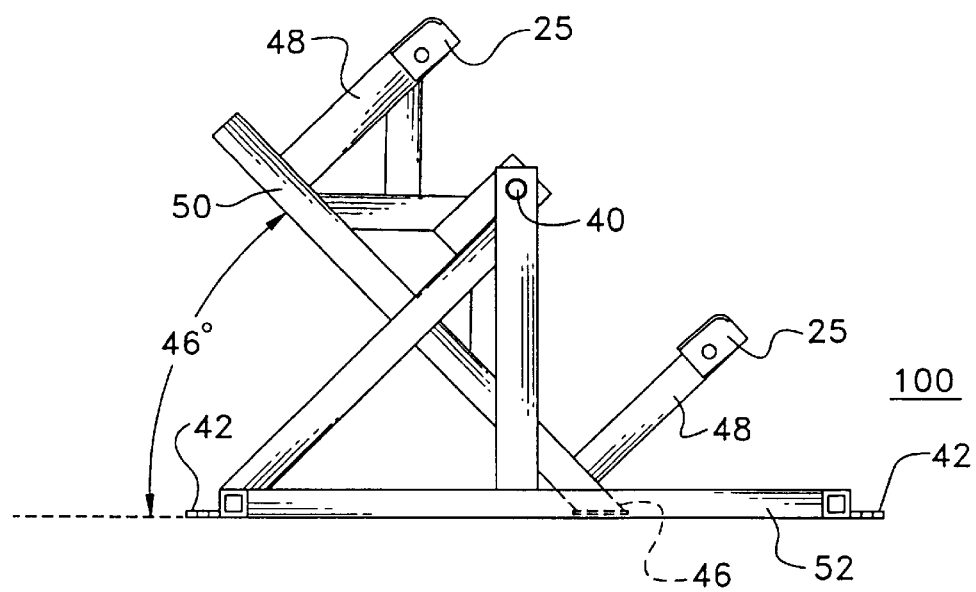
FIG. 2: is a side plan view of the loading fixture of FIG. 1 in a transporting position.

Loading fixtures, methods for their use and vehicles containing such fixtures are provided by this invention. The present concept is to safely support large bulky items during transport with a minimum of travel restrictions. The preferred fixture also includes a plurality of rotating boots which rotate to contact and support the cargo. The preferred fixture also includes a novel rotating mechanism for helping to minimize the "effective width" of the item, especially during its passage over regulated roads. As used herein, the term "effective width" is the widest distance of the cargo as measured transversely from the direction of travel by a pair of imaginary parallel planes drawn perpendicularly from the roadway, waterway or railroad bed surface.

FIGS. 1–4 show a preferred loading fixture 100 having a support arm 20 swivelly mounted to a support frame 10. The support frame 10 and arm 20 are desirably produced from tubular low carbon steel bars which are cut to size and then welded together. The support arm 20 can include a horizontal arm member 50 having a pair of transverse ends. Located at each of these transverse ends are vertical arm members 48 which form a large "W"-like swinging trapeze-like structure. At the approximate center of the "W" is a pipe and pin assembly 40 for supporting the support arm 20 in a preferred horizontal loading position with the support frame 10. Ideally, in this position, the bottom of the support arm is substantially parallel with the base 52 of the support frame 10, although this is not required. The rotating boots 25 rotate about pivot points near the ends or each vertical arm member 48.

The preferred support arm 20 is designed to rotate in at least one direction. Upon traversing its full rotation to a transporting position, stop 46 will contact the bed of the trailer 200. This position can be about 30–50°, and preferably is about 46° from horizontal for enabling large objects, such as a double-T 300, to display a smaller effective width.

In this way, large cargo can be received by the vertical arm members 48 of the support arm. This invention further provides rotating boots 25, swivelly mounted to the vertical arm members 48, which help to more readily adjust the weight of large cargo, avoid binding, and help to focus the center of gravity of the cargo to the area of the central pin 40 so that it can be rotated manually without heavy equipment. While this is not a requirement, it can greatly reduce the cost of loading and unloading such cargo.

In another feature of the preferred embodiment, a safety pin coupling (not shown) is provided along one of the inclined posts of the support frame 10. The safety pin coupling can include, for example, a pair of tabs having apertures therethrough. One tab can be welded to an inclined post of the support frame 10 and another is welded to the lower surface of the horizontal arm member 50, for example. Upon tilting the arm 20 to the second transporting position, the holes in these tabs can be aligned to enable a locking pin to be disposed therethrough to fix the arm 20 in the second transporting position during vehicle motion.

In yet a further improvement of this invention, a pair of bolting plates 42 can be provided laterally from the edges of the base 52 of the support frame 10. These bolting plates 42 can have a series of holes therethrough for enabling attachment, and in the case of slotted or oval openings, selective width adjustment for accommodating different size trailers 200.

Figure 3:
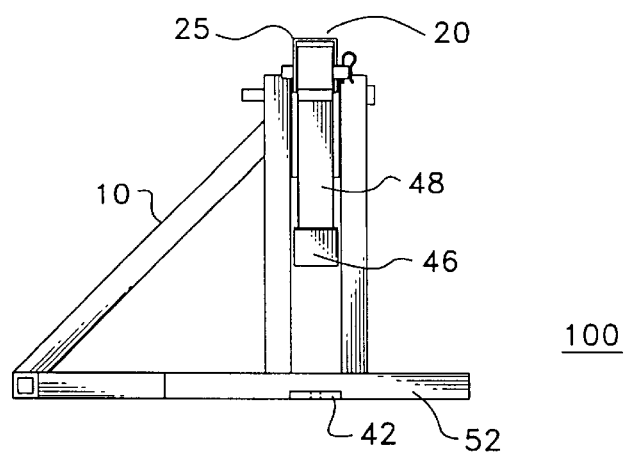
FIG. 3: is a side plan view of the loading fixture of FIG. 1.
Figure 4:
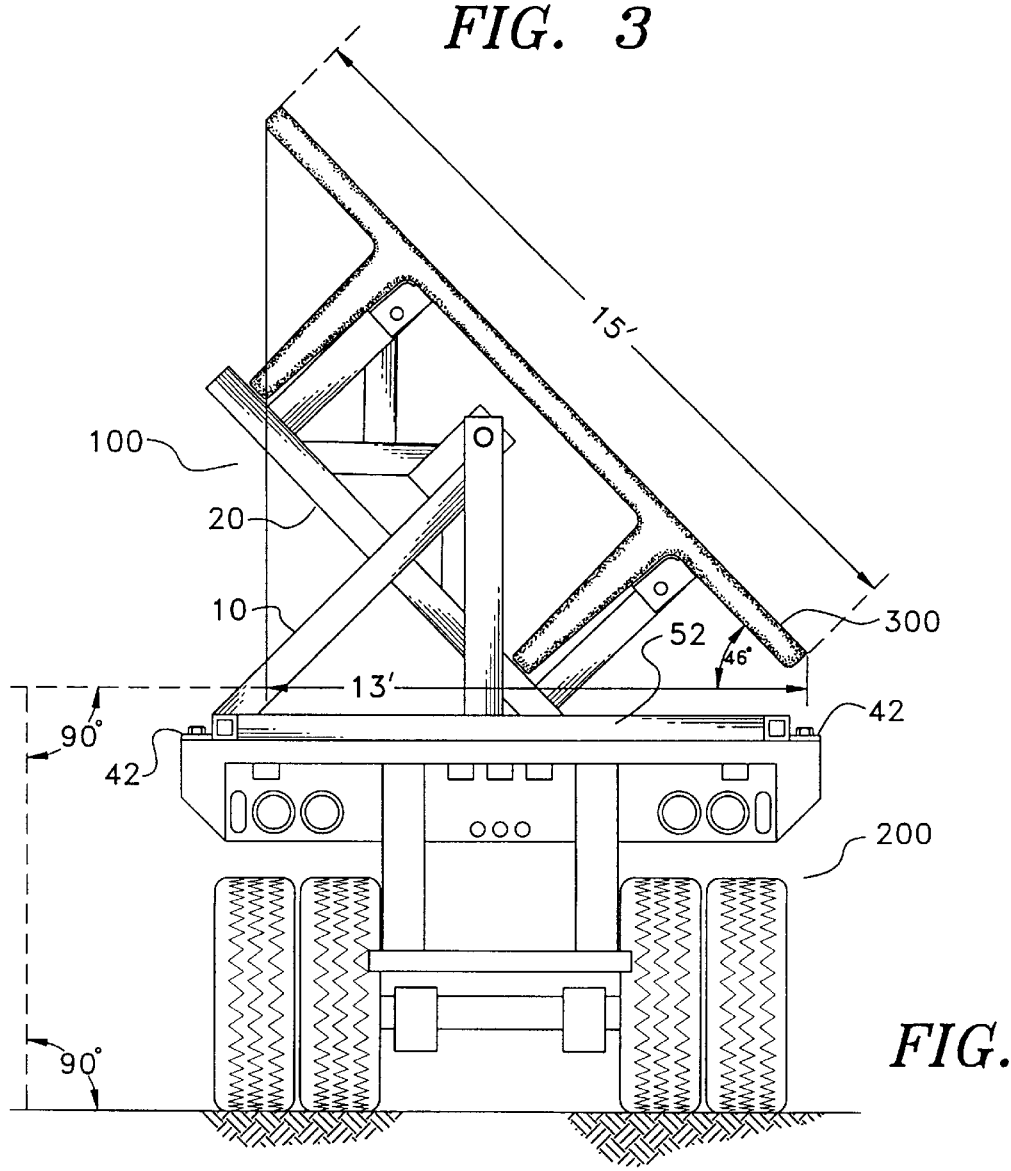
FIG. 4: is a rear plan view of the loading fixture of FIG. 1 mounted to the bedframe of a trailer.

As shown in FIG. 3, a double-T 300 can be supported at approximately 46° without tipping a trailer while simultaneously reducing a 15' effective length to about 13'. It is further noted that the center of gravity for the double-T does not significantly vary from the location of the pin 40 even when the double-T is rotated from the first loading position (0°) to the second transporting position (46°). This encourages stability and reduces the amount of force necessary to tilt the cargo between positions.

From the foregoing, it can be realized that this invention provides improved methods for transporting large bulky items such as I-beams, double-T's and prefabricated housing units over water or land. The preferred fixtures of this invention delicately balance these large objects by focusing the center of gravity in a central portion of the fixture even when the large heavy object is being rotated. The cost savings of reducing the "effective width" of such cargo is significant and the cargo can be delivered to construction workers without significantly delaying the beginning of their work day. Although various embodiments have been illustrated, this is for the purpose of describing, but not limiting the invention. Various modification, which will become apparent to one skilled in the art, are within the scope of this invention described in the attached claims.

We claim:

1. A loading fixture suitable for transporting cargo, comprising:
   an arm, disposed to support said cargo in a tilted transporting position;
   a pair of perpendicular members extending in a perpendicular direction from said arm; and
   a plurality of boots, each disposed at a respective end portion of each of said perpendicular members, each boot being shaped to contact and support a corner of the cargo, wherein each of said perpendicular members positions a respective boot to contact and support a respective corner of the cargo simultaneously.

2. The loading fixture of claim 1 wherein said arm is swivelly mounted to a support frame by a pin.

3. The fixture of claim 2 wherein a center of gravity of said cargo does not vary substantially from the location of said pin when said cargo is rotated from a horizontal position to said transporting position.

4. The loading fixture of claim 1 wherein said transporting position represents an angle of about 30–50° from horizontal.

5. A loading fixture according to claim 1, wherein each of the plurality of boots is pivotally mounted for rotating to support a corresponding inside corner.

6. A loading fixture according to claim 1, wherein each of the plurality of boots has a shape to accommodate a corner of a double-tee.

7. The loading fixture of claim 1 further comprising a trailer having a plurality of wheels transversely mounted to at least one axle, and a bedframe.

8. A vehicle for transporting cargo, comprising:
   a bed frame having at least one axle and a plurality of wheels coupled thereto;
   a support frame mounted on the bedframe; and
   a loading fixture mounted to the support frame for contacting the cargo, comprising:
      an arm, disposed to support said cargo in a tilted transporting position for reducing the effective width of said cargo relative to a transport surface;
      a pair of perpendicular members extending in a perpendicular direction from said arm; and
      a plurality of boots, each disposed on a respective end portion of each of said perpendicular members, each boot being shaped to contact and support a corner of the cargo, wherein each of said perpendicular members positions a respective boot to contact and support a respective corner of the cargo simultaneously.

9. A loading fixture suitable for transporting a double-tee, comprising:
   a body having a tilted transporting position;
   a pair of perpendicular members extending in a perpendicular direction from said body, each perpendicular member being shaped and positioned so that both perpendicular members simultaneously contact and support respective corners of the double-tee.

10. A loading fixture according to claim 9, wherein each perpendicular member includes a curved surface to contact the double tee.

11. A loading fixture according to claim 9, wherein each perpendicular member includes a rotating boot having a surface shaped to contact the corner.

12. A loading fixture according to claim 9, wherein each perpendicular member has a length equal to a length of a respective leg of the double-tee, so that the legs of the double-tee touch the body while two corners of the double-tee contact the perpendicular members.

13. A loading fixture according to claim 9, wherein the body is a swivelling arm, and the arm swivels about a pin disposed approximately at a center of gravity of the double-tee.

14. A method for loading cargo for transport, comprising the steps of:
   positioning a plurality of boots into positions for contacting and supporting respective corners of the cargo simultaneously; and
   loading the cargo on a loading fixture having a tilted transporting position for reducing the effective width of said cargo relative to a transport surface, the fixture having an arm and a pair of perpendicular members extending in a perpendicular direction from said arm, each of the plurality of boots being disposed on a respective end portion of a respective perpendicular member, such that each of the boots contacts a respective corner of the cargo.

15. A method for transporting cargo according to claim 14, wherein the step of positioning the boots includes rotating the boots about pivot points located near respective ends of the perpendicular members.

16. A method for transporting cargo according to claim 14, further comprising:

swivelling the loading fixture from a horizontal position to the tilted transporting position.

17. A method according to claim 14, wherein the step of swivelling the loading fixture includes swivelling the loading fixture about an axis near a center of gravity of the cargo.

18. A method according to claim 14, wherein the cargo includes a double-tee.

19. A method for loading a double-tee for transport, comprising the steps of:

placing the double-tee on a loading fixture having a body and a pair of perpendicular members, the pair of perpendicular members extending in a perpendicular direction from said body, so that both perpendicular members simultaneously contact and support a respective corner of the double-tee; and tilting the double-tee to a transport position.

20. A method according to claim 19, further comprising the step of:

swivelling a pair of rotating boots positioned at respective ends of the perpendicular members, so as to position the double-tee.

21. A method according to claim 19, further comprising the step of:

contacting the body with legs of the double-tee while the perpendicular members contact the corners of the double-tee.

22. A method according to claim 19, wherein the step of tilting the double tee includes swivelling the double-tee about a pin of the loading fixture positioned at approximately the center of gravity of the double-tee.

* * * * *